Feb. 21, 1956   W. G. COLTON ET AL   2,735,945
FAULT DETECTOR FOR STRANDING MACHINES
Filed March 26, 1951
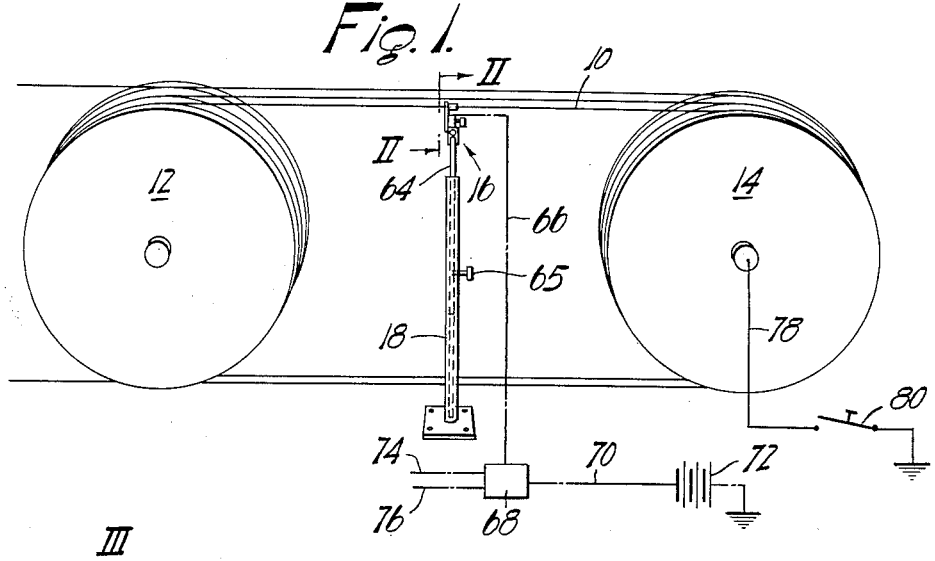
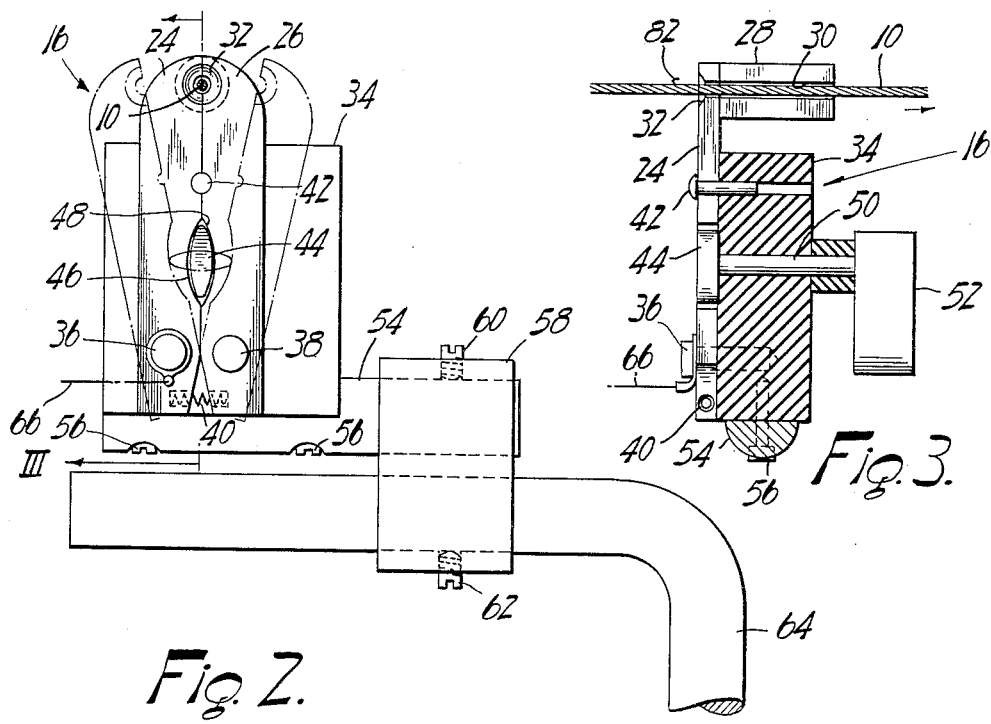
INVENTORS
Wilbert G. Colton & Henry Buszka
BY
Bean, Brooks, Buckley + Bean
ATTORNEYS

United States Patent Office 2,735,945
Patented Feb. 21, 1956

2,735,945

FAULT DETECTOR FOR STRANDING MACHINES

Wilbert G. Colton and Henry Buszka, Buffalo, N. Y.

Application March 26, 1951, Serial No. 217,502

1 Claim. (Cl. 200—61.41)

This invention relates to wire cable manufacture and has for its object the provision of an improved automatic detector which will be responsive to irregularities in the wire cable during the manufacture or testing thereof.

Another object of the invention is to provide a fault detector which will be responsive to minor snags and kinks as well as to comparatively large irregularities or breaks in the wire to which it is applied.

Another object of the invention is to provide an improved electrical detector which will respond to faults without directly mechanically halting motion of the wire under test, and which will permit snags to pass therethrough without jamming, while remaining fully sensitive to various wire faults.

Still another object of the invention is to provide an improved wire cable fault detector which will be simple and rugged in construction and sensitive and reliable in operation.

Other objects will be apparent from the following description wherein—

Fig. 1 is a general illustration of one embodiment of the invention as applied to wire cable manuacture;

Fig. 2 is a detail view taken about on line 2—2 of Fig. 1; and

Fig. 3 is a sectional view taken about on line 3—3 of Fig. 2.

One embodiment of the invention is illustrated in Fig. 1 as applied to the testing of a wire cable 10 as it is passed over a pair of drums 12, 14 in a typical manufacturing or testing operation, such as may be associated with a stranding machine. According to the invention, the drums 12, 14 are arranged to guide one pass of the cable 10 so as to normally maintain the cable taut and in constant axial position, and a gauge device generally indicated at 16 is mounted on a standard 18 and is located so as to embrace the passing cable 10.

Referring to Figs. 2 and 3, the gauge device 16 comprises a pair of jaws 24, 26 each mounting at its top one of a pair of cooperating semi-cylindrically grooved gauge portions 28 which together form a bore 30 having a slightly larger diameter than that of the wire 10 under test. Additionally, the gauge portions 28 are locally chamfered at one side to form a generally conical countersunk portion 32 at one end of the bore 30, for a purpose which will appear hereinafter.

The jaws 24, 26 are pivotally mounted on a block 34 of insulating material by cap screws 36, 38 and are urged into engagement by a spring 40 against a stud 42 which projects between the jaws from the mounting block 34 to act as a common stop for the jaws and to provide for the centering of the same. Additionally, a cam device 44 is disposed between the jaws to cooperate with complementing surfaces 46, 48 thereof. This cam device is carried by a shaft 50 which is journaled in the block 34 and is provided with a handle 52 by which it may be rotated so as to operate the cam device 44 against the jaws 24, 26 whereby the latter may be spread to admit the wire 10 during setting up operations.

The mounting block 34 is carried in turn by a support stud 54 to which it is fixed by screws 56, and the support stud cooperates with a clamp 58 having set screws 60, 62 to form a horizontally adjustable bracket for connection to a vertical support rod 64. This support rod is arranged to telescope into the standard 18 wherein it is held in vertical adjustment by a set wheel 65.

The electrical circuit of the invention includes a conductor 66 which connects between the jaws 24, 26 and a detector relay 68 which is connected in turn by a wire 70 to a battery 72 and thence to ground. These wires 66, 70 comprise the input circuit of the detector relay, the output of which is connected to another pair of wires 74, 76. The detector relay may be of any convenient type, such as for example it may be electromagnetic or electronic, but it is generally desirable in any event that its input power requirements be fairly small. The wire 10 under test is maintained at ground potential by any suitable means, such as for example, it may be grounded through contact with the drum 14 which is grounded in turn through a wire 78 and a switch 80.

As is illustrated in the drawing, the gauge device 16 is located by adjustment of the clamp 58 and the vertical support rod 64 so that the wire 10 passes centrally through the bore 30. Thus there is a small clearance between the wire and the bore which is maintained so long as no irregularity in the surface of the wire, such as the broken strand 82, disrupts the spaced relationship. Upon the occurrence of such a snag the space between the wire 10 and the bore 30 will thereby be bridged whereupon electrical contact therebetween will be established thus closing a circuit comprising the wire 10, the gauge device 16, the wire 66, the detector relay 68, the wire 70, and the battery 72, through ground to the switch 80 and thence to the drum 14. Assuming that the switch 80 is closed, the closing of the aforementioned circuit will result in the actuation of the fault detector relay 68 and the consequent closing of its output circuit 74, 76 whereby any manufacturing or test result may be initiated, such as, for example, the stopping of the drums 12, 14 or the actuation of a warning indicator or the like.

While only one type of cable fault has been illustrated in the drawing, it will be appreciated that the snag detector of the invention will be equally responsive to other manufacturing or test irregularities, such as, for example, a break on the wire whereby the loss of tension in the wire will result in contact between it and the bore 30. The conical forward end 32 of the bore 30 will accommodate large irregularities in the wire 10 whereby the jaws 24, 26 will be automatically forced apart so as to pass the irregularity without placing undue strain on either the wire 10 or the gauge device 16. Of course, the fact that the gauge device is designed to yield and pass large obstructions in no way makes it ineffective to detect such faults because the very act of spreading the jaws 24, 26 by such a snag is brought about by a metal to metal bearing against the conical surface 32 whereby the detector relay 68 is actuated.

Since the snag detector of the invention is set up mechanically but is tripped electrically, it can be made to have massive ruggedness together with delicate sensitivity such as would be incompatible in a purely mechanical device. Thus the relay 68 may be made to trip upon the occurrence of the flimsiest projecting broken filament and yet the gauge device itself need have no delicately poised action such as would be likely to get out of adjustment or repair.

While the fault detector of the invention has been illustrated as having a gauge device with a circularly cylindrical bore and as being applied to cable, it will be appreciated that the testing of various types of bodies according to the invention may require various shapes and arrangements of gauge channels or dimension testing probes.

Thus, it will be appreciated that various modifications and changes could be made within the scope of the invention and of the appended claim.

What is claimed is:

In a fault detector for testing stranded wire cable, a pair of jaws each having a semi-cylindrical groove substantially perpendicular to the plane of said jaws, means mounting each of said jaws for separate spreading movement to open positions, spring means arranged to urge said jaws into contact at a closed position with said grooves in complementing relation whereby to form a cylindrical bore of similar shape and slightly larger diameter than the normal diameter of the wire cable under test, stop means for said jaws arranged to define the closed position of each against the urge of said spring means for fixing the location of said bore when the jaws are closed, said jaws being chamfered at one end of said groove to form a conically countersunk portion at one end of said bore to provide a funnel shaped entrance thereto, cable feeding and tensioning guide means arranged to normally pass said cable centrally through said bore by and during maintenance of the cable tension, and electric circuit means including said jaws and said guide means closable by means of current conducting contact between said cable and said bore as a result of a structural fault in said cable, said stop means including manually operable cam means for spreading said jaws simultaneously against the urge of said spring means to said open positions whereby to open said bore to facilitate placing the cable in said bore during detector setting-up operations.

References Cited in the file of this patent

UNITED STATES PATENTS

| | | |
|---|---|---|
| 568,205 | Norden | Sept. 22, 1896 |
| 712,201 | Norden | Oct. 28, 1902 |
| 1,515,666 | Elderkin | Nov. 18, 1924 |
| 1,792,979 | Greenleaf | Feb. 17, 1931 |
| 2,242,890 | Keeler | May 20, 1941 |
| 2,386,127 | Longfellow | Oct. 2, 1945 |
| 2,445,808 | Stenstrom | July 27, 1948 |
| 2,501,482 | Boynton | Mar. 21, 1950 |